Jan. 1, 1952  C. L. GOODWIN  2,580,539
ELECTRICAL REMOTE-CONTROL SYSTEM
Filed Sept. 30, 1947  2 SHEETS—SHEET 1
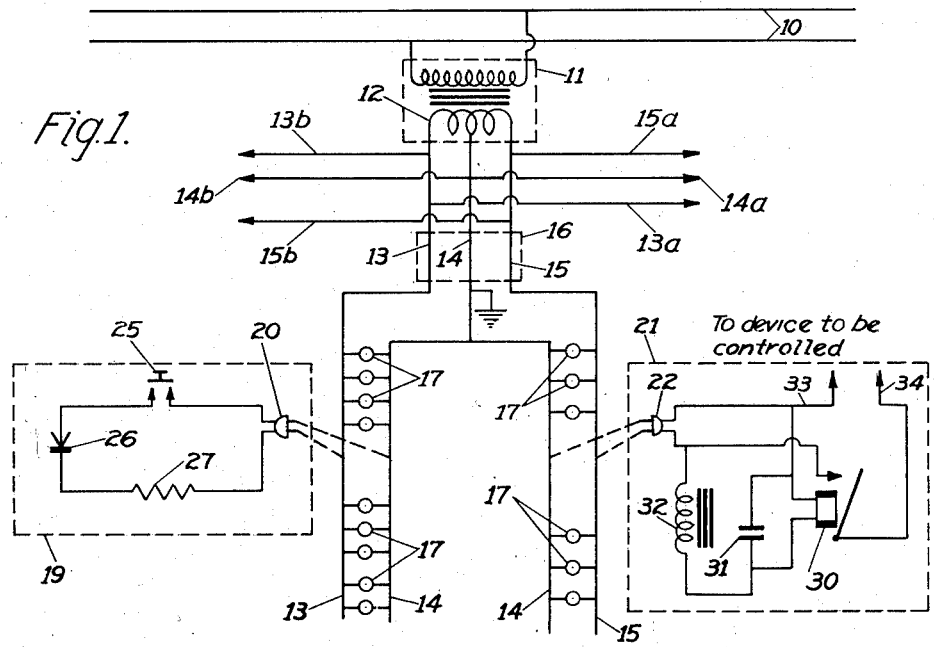
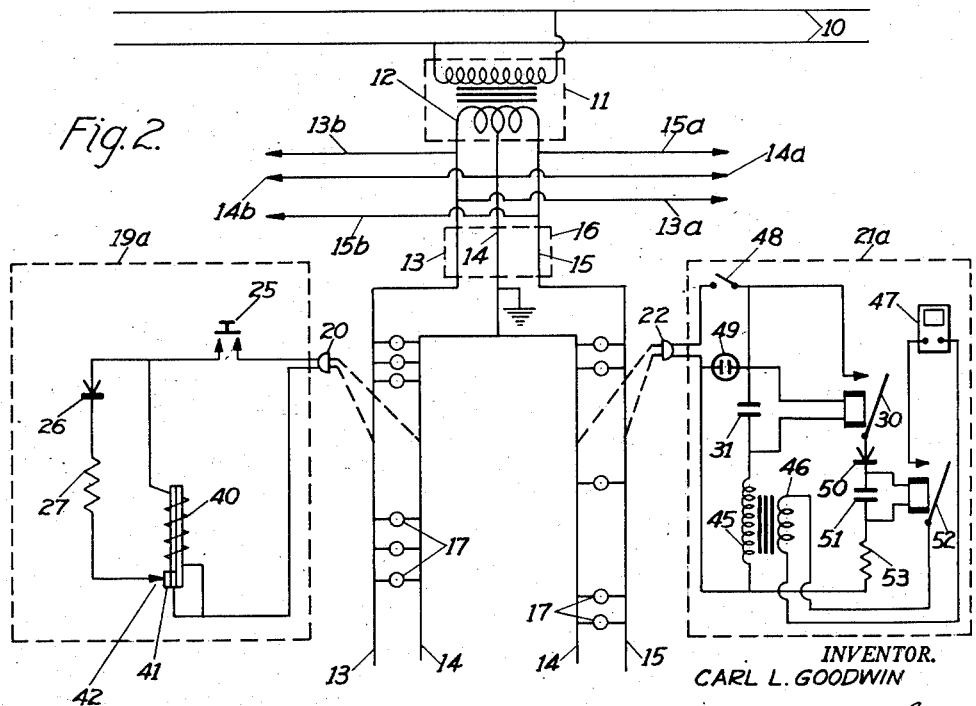
INVENTOR.
CARL L. GOODWIN
BY Bosworth & Sessions
ATTORNEYS.

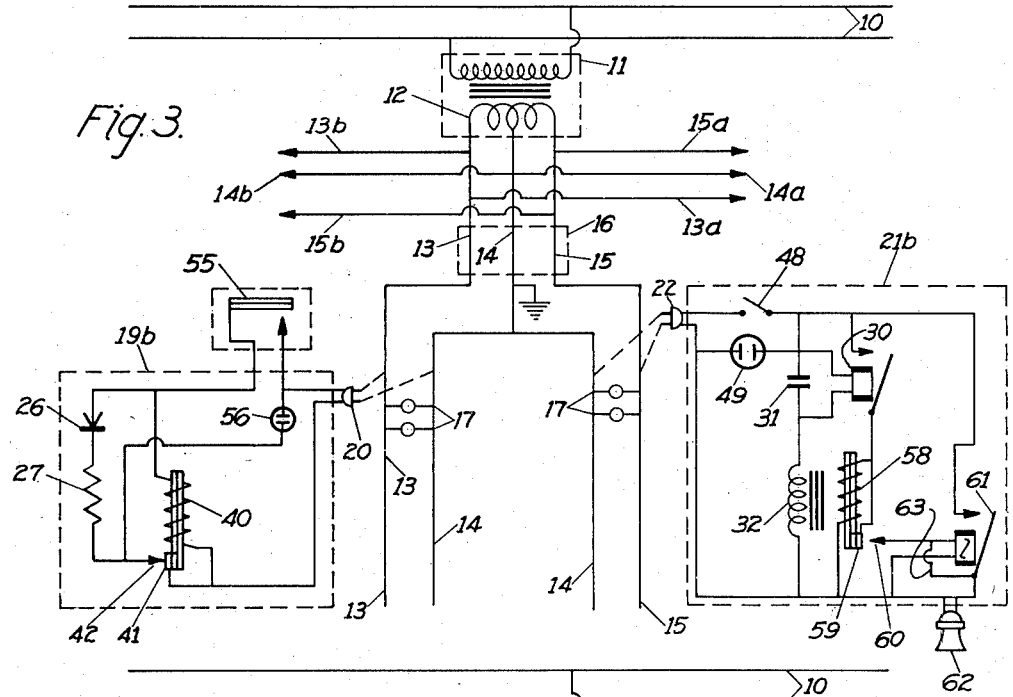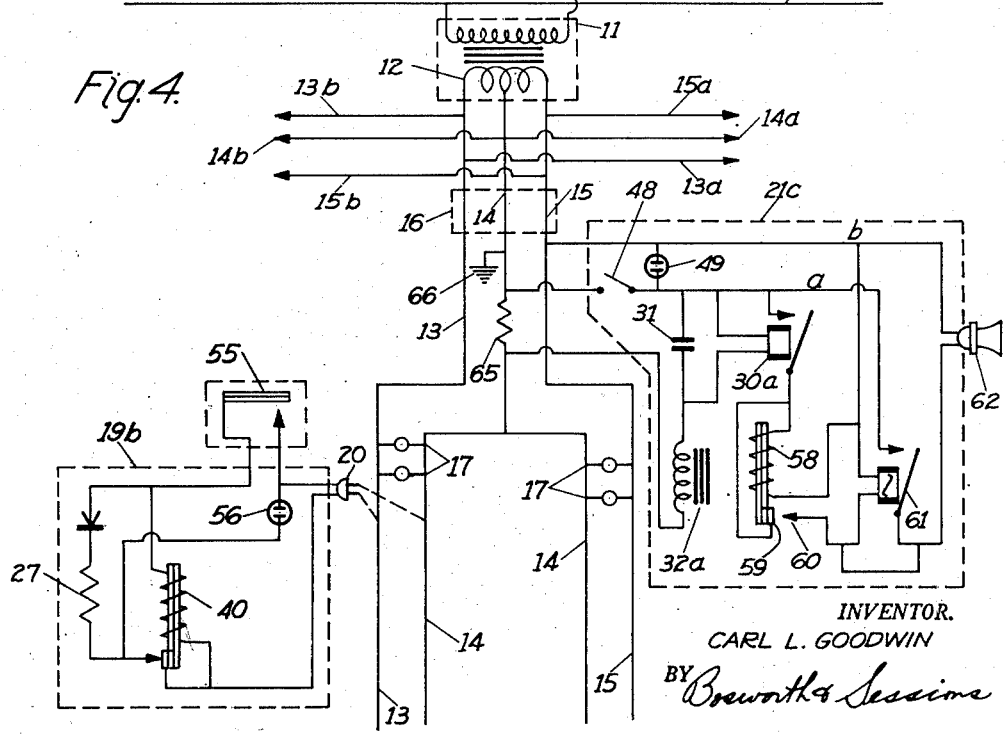

Patented Jan. 1, 1952

2,580,539

UNITED STATES PATENT OFFICE 2,580,539

ELECTRICAL REMOTE-CONTROL SYSTEM

Carl L. Goodwin, Bay Village, Ohio

Application September 30, 1947, Serial No. 776,879

3 Claims. (Cl. 177—352)

This invention relates to electrical remote control systems and more particularly to an electrical remote control system adapted for use with ordinary alternating current wiring systems whereby the existing wiring may be used for remote signaling or to control remote electrical appliances or the like. The system is described herein in conjunction with an ordinary three-wire alternating current domestic wiring system, but it is to be understood that the invention may be adapted to other uses and purposes. In this specification, the term "wiring system" is used to mean the customer's wiring as distinguished from the power distribution system, and includes only the secondary of the transformer ordinarily provided to step down the voltage of the mains to the customers and the wiring connected to the transformer secondary.

A general object of the invention is to provide a simple, reliable and economical remote control system comprising a sending or controlling station or unit and a receiving or controlled station or unit, both of which may be connected into an ordinary alternating current wiring system by merely plugging the stations into ordinary outlets. Another object of the invention is the provision of such a system in which there is negligible current drain when the system is inactive. Another object is to provide such a system in which the components are all standard and well known whereby the apparatus may be constructed at reasonable cost. Another object is to provide such an apparatus of great reliability and long life. A further object is the provision of an apparatus which will respond immediately, requiring no period for warming up.

Briefly, I accomplish the above and other objects of my invention by providing a sending unit or station which includes a switch and a device adapted to conduct a current of a different character from the line current (for example, with ordinary 60 cycle current I may employ a device which will conduct direct current or a device which will conduct alternating current of a frequency substantially higher than 60 cycles). This unit is connected across two lines of the wiring system and when the switch is closed, a current different from the ordinary line current is caused to flow. Because of line resistance, impedance, transformer regulation, and the like, this current creates a voltage between the lines of the wiring system, which voltage has a component corresponding to the current conducted through the sending unit; this component of the voltage is utilized by means of appropriate filters and relays also connected across the lines of the power system in the receiving unit to control a signal or the operation of an appliance or other device.

In its preferred form, my invention comprises a sending or controlling station embodying a normally open switch, a resistor and an asymmetric conducting device such as a selenium rectifier, all connected in series across two of the lines of a conventional alternating current wiring system. The receiving or controlled station comprises a choke or inductance connected in series with a direct current controlled device, such as a sensitive magnetic relay or a vacuum tube operated relay, a condenser being connected across the direct current controlled device; the receiving or controlled station, like the sending or controlling station, is connected across two of the lines of the wiring system, and thus also may be connected into the system merely by plugging it into a conventional outlet. Closing of the switch in the sending station causes a pulsating direct current to flow through the asymmetric device between two lines of the wiring system. Because of this flow of current, voltage having a direct current component appears across the lines of the wiring system. This voltage is created by the IR drop due to the series resistance of the wiring and partly due to the regulation effects in the transformer. Regardless of causes, closing the circuit through the asymmetric conducting device across the lines creates a voltage containing a direct current component across the lines; the direct current controlled device in the receiving station is actuated by this voltage, and the operation of the direct current controlled device may be utilized to produce a signal, to control the operation of an appliance, to turn lights on and off, or to serve various other useful purposes. The choke and the condenser in the receiving station act as a filter circuit to prevent flow of any substantial alternating current while the device is connected across the lines, to prevent imposition of any substantial A. C. voltage across the direct current controlled device, and serve as well to "sort-out" the direct current voltage component and to isolate a substantial portion of the same across the direct current controlled device.

Referring now to the drawings, Figure 1 illustrates a simple form of my invention as applied to a conventional three-wire domestic wiring system; Figure 2 illustrates my remote control system as adapted to operate a buzzer; Figure 3 shows my remote control system as applied to a fire alarm; and Figure 4 shows a modified form of fire alarm system.

Figure 1 of the drawings illustrates a system embodying a simple push button sending station adapted to effect remote control of a circuit associated with the receiving station. In this figure, the power mains are indicated at 10, and the conventional transformer, which steps down the voltage of the mains to the voltage employed in the building wiring system, is indicated at 11. The secondary 12 of the transformer 11 has three leads 13, 14 and 15 which lead through the conventional service entrance box 16 and constitute the domestic or other building wiring. In ordinary domestic wiring systems, one transformer 11 may supply a plurality of customers, and accordingly leads 13, 14 and 15 are ordinarily provided with branches as indicated at 13a, 14a and 15a and 13b, 14b and 15b leading to other building wiring systems.

The center lead 14 is grounded, while the leads 13 and 15 constitute the outer legs of the wiring system. The load on the system is indicated by the lamps 17. Some of the lamps are connected between the outer leg 13 and the center leg 14, and others are connected between the outer leg 15 and the center leg 14 as is customary in conventional three-wire alternating current systems. The sending or controlling station is indicated in general at 19 and is connected by a conventional plug 20 across the legs 13 and 14. The receiving station is indicated in general at 21 and is connected by a conventional plug 22 across the lines 14 and 15. Thus, the receiving and sending stations are shown as being connected to different branches of the wiring system. However, it is to be understood that they also may be connected in the same branch of the wiring system. In fact, when connected in the same branch, a greater direct current component of voltage is available for operation of the receiving station. It is to be understood that the invention also may be used with ordinary two-wire wiring systems.

In order to create the direct current component of voltage required for operation of the system, the sending station 19 comprises a push button 25 and an asymmetric device such as the selenium rectifier 26 and a resistance 27 all connected in series. The purpose of the resistance 27 is to limit to a reasonable value the amount of current which flows through the sending station when the push button switch is closed. When the button is pushed, the circuit between the outer leg 13 and the center leg 14 of the wiring system is closed through the rectifier 26 and the resistor 27. The rectifier permits current to flow through it in one direction, but substantially prevents the flow of current in the other. Thus, one-half wave of each cycle of alternating current is substantially blocked by the rectifier, while the other half of each cycle is permitted to flow. Accordingly, the action of the rectifier results in the imposition of a pulsating direct current on any normal alternating current flowing in the system. Thus, an asymmetric alternating current is caused to flow in the system. Due to the series line resistance of the conductors 13 and 14 and also due in part to the regulation of the transformer, this asymmetric current flowing through the wiring system causes a voltage drop across the lines of the wiring. Inasmuch as the current flowing through the system is asymmetric, the voltage developed in the lines due to this current also is asymmetric. Thus, there is developed an asymmetric voltage which may be considered as embodying a steady direct current voltage component. In the receiving station, this direct current component of voltage is substantially isolated across the direct current controlled device and thereby utilized to effect the desired control.

It is to be noted that in the system shown, flow of the asymmetric current results in an IR drop between the outer leg 13 and center leg 14 because of the series resistance of these legs and because of the regulation of the transformer. There is no such IR drop due to the resistance of the outer leg 15 inasmuch as the asymmetric current through the sending station does not flow through the outer leg 15. Also, regulation effects in the transformer do not contribute to the establishment of a control voltage between the outer leg 15 and the center leg. Accordingly, the voltage drop between the outer leg 15 and the center leg 14 is less than the voltage drop between the outer leg 13 and the center leg 14. However, in most instances the voltage drop between the outer leg 15 and the center leg 14 is sufficient to operate the receiving station even though the sending station is connected to the other branch of the system. If sufficient voltage cannot be developed otherwise, the IR drop usually may be increased by placing a very small resistance, say 0.1 to 0.3 ohm, in series with the center leg 14 of the wiring system.

The receiving station 21, in which the direct current component of the voltage generated in the wiring system by reason of the flow of asymmetric current through the sending station is utilized, may comprise a sensitive direct current relay 30 having a condenser 31 connected in parallel with it, the relay and condenser being connected across the lines 14 and 15 in series with a choke or inductance 32. The choke 32 limits the alternating current which can flow through the circuit of the receiving station to a low value. This small alternating current is in large part bypassed around the relay by the condenser 31. However, when the button 25 is pushed to close the circuit through the sending station 19, the direct current component of the voltage produced across the lines causes a direct current to flow through the choke, which has negligible non-inductive resistance; this current is blocked by the condenser 31. A direct current component is thus caused to flow through the relay 30, actuating the relay to close the circuit therethrough. In the embodiment shown, the relay is utilized to control the alternating current circuit including conductors 33 and 34 which lead to any device which is intended to be operated or controlled.

As examples of components which are suitable for use in an ordinary 110 volt 60 cycle wiring system, the rectifier 26 may be a selenium rectifier having a capacity of 200 milliamperes but which is capable of carrying large overloads for short periods of time, and the resistor 27 may be a 25 ohm 50 watt resistor which is also capable of carrying large overloads for short periods of time. In the receiving station, the choke 32 may have an inductance of about 2 henries and 5 ohms D. C. resistance. The condenser 31 may be a 10 volt electrolytic condenser having a capacity of 1500 microfarads, while the relay 30 preferably has a sensitivity of 2.5 milliwatts or better and a coil resistance of about 5 ohms. Obviously, these values can be varied within reasonably wide limits, and for other types of circuits, different values may be utilized. However, components with the values set forth have given excellent results with great reliability of operation in a 110 volt 60 cycle three-wire system.

Figure 2 of the drawings shows a buzzer system embodying my invention. In this figure, the wiring system is the same as that previously described, and the same reference characters have been applied to similar parts. Also, many of the components of the sending and receiving stations are the same as previously described, and the same reference characters have been applied to these components.

As noted above, the rectifier 26 and the resistor 27 preferably are operated at a considerable overload. This mode of operation is desirable because these units need only carry current for short intervals of time, and it is desirable to use a small rectifier and resistor and overload them in order to save in first cost and to provide economy of space. In the sending station 19a of Figure 2, means are provided for protecting the rectifier and resistor against prolonged overloads. The protection is obtained by a normally closed bimetallic thermostatic switch 40, the coil of which is connected in parallel with the rectifier 26 and resistor 27. If the push button 25 is held down for more than say seven seconds, the current flowing through the coil of the switch 40 will heat the bimetallic element thereof causing the contact 41 to move away from the contact 42 and thus opening the circuit through the rectifier 26 and resistor 27 before the rectifier and resistor become overheated and damaged by the overload applied to them in normal operation of the system.

The receiving unit 21a in Figure 2 operates on precisely the same principle as the unit 21 heretofore described and includes the sensitive relay 30 and condenser 31. In this form of the invention, however, the choke or inductance in series with the relay is formed by the primary 45 of a transformer having a secondary 46 which furnishes the low voltage alternating current for operating the buzzer 47. The circuit leading to the relay 30 and transformer primary 45 includes a switch 48 by which the receiving unit may be shut off and a pilot lamp 49 which burns whenever the receiving unit is connected into the circuit and switch 48 is closed.

In ordinary domestic wiring systems, particularly when there are motor driven devices such as fans and refrigerators connected to the system, there may be transient effects which will cause sufficient direct current to flow in the system to close the relay 30 momentarily. Similar transients often occur when the power is first turned on. In order to prevent such transient effects from sounding the buzzer 47, the relay 30 is employed to close a circuit through a selenium rectifier 50, a condenser 51 across which a relay 52 is connected and a resistor 53. The condenser and resistor provide a time delay circuit, it being necessary to charge the condenser 51 with the direct current produced by the rectifier 50 before the relay 52 will be closed.

By this means, a delay of, for example ¾ of a second, can be introduced into the system, and while momentary closing of the relay 30 will not result in the closing of the relay 52, the relay 52 will operate and close whenever the relay 30 remains closed for more than the time delay introduced by the condenser 51 and associated elements. Upon closing of the relay 52, the buzzer 47 will sound. The delay so introduced into the circuit is insufficient to be noticeable in operation, and while the buzzer will sound whenever the push button 25 is depressed for more than for example ¾ of a second, it will not sound even though the relay 30 may be momentarily closed by transient effects in the system.

Sending units such as 19a and receiving units such as 21a may be plugged into a conventional wiring system anywhere in the system, thus making it possible to signal from any point in the system to any other point in the system without requiring any additional wiring. Apparatus of this type can be used to operate call bells and buzzers which can be installed in existing buildings without requiring the installation of any additional wiring.

My system also is useful in connection with fire and burglar alarms. Figure 3 shows one adaptation of my system to a fire alarm. Here the sending unit 19b is identical with the sending unit 19a, including the rectifier 26, resistor 27 and thermostatic switch 40, but instead of the push button 25 a thermally operated, mechanically locking switch 55 is employed. This switch, which may be of any known type, normally is open; when the temperature of the switch is raised to a predetermined degree, the switch closes and remains closed even if the temperature should drop, permitting current to flow through the rectifier and resistor as before and creating the direct current voltage components in the wiring system as previously described. In this modification, the sending unit 19b also is provided with a neon-type pilot lamp 56 which burns so long as the thermostatic switch 40 is closed. When the thermally operated switch 55 closes, the thermostatic switch 40 opens after a predetermined interval as previously described in connection with Figure 2. Opening of the switch 40, opens the circuit leading to the pilot light 56 which is thereupon extinguished. Thus, if an alarm should sound in a system employing several fire detecting sending stations, the station sending the alarm can be determined because its pilot light 56 will be extinguished.

After normal conditions have been restored, the station sending the alarm may be reset by manually opening the thermally operated switch 55; after switch 55 is opened, the thermostatic switch 40 will remain open until it cools sufficiently to permit its contacts to close. Under such circumstances, there is a path for the flow of current from line 14 through plug 20, the heating coil of the thermostatic switch 40, rectifier 26, resistor 27 and pilot light 56 back to plug 20 and line 13. The neon glow lamp 56, however, carries so little current that the thermostatic switch 40 will cool almost as rapidly as if there were no current flowing through it, and its contacts will open shortly after switch 55 is reset, thus restoring the sending station to its normal condition. It is important to use a neon-type of pilot lamp, or another type of lamp having a high resistance, in this circuit so as to prevent sufficient current from flowing through the heating coil of the thermostatic switch 40 to maintain the contacts of the switch 40 in open position after the contacts of the switch 55 have been reset to open position.

The receiving unit 21b is similar to unit 21a heretofore described and includes a relay 30, condenser 31, choke 32, switch 48 and pilot light 49. In this form of the invention, however, instead of using a condenser, resistor and rectifier to obtain a time delay to prevent the alarm from being sounded by transient effects, a normally open thermostatic switch 58 is connected into the circuit controlled by the relay 30. Closing of the relay 30 results in heating of the thermostatic element of the switch 58 and the closing of the circuit through the contacts 59 and 60 of the switch. This circuit leads to the alternating current relay 61 which thereupon closes, supplying current to the alarm horn 62. It will be noted that the conductor 63 provides a holding circuit for the relay 61 so that when the relay is once closed, it will remain locked in, and the horn 62 will sound until the switch 48 is opened regardless of the position of the relay 30 or the thermostatic switch 58.

An apparatus such as shown in Figure 3 provides a simple fire alarm in which one or more sending or fire detecting units may be employed in the system in connection with one or more receiving or alarm units. The apparatus provides a simple and reliable alarm system which may be installed merely by plugging the detecting and alarm units into the ordinary wiring system without requiring any additional wiring. While the detecting unit is shown as embodying a thermally operated switch for detecting fires, it will be evident that other detecting devices such as burglar alarms and photo-cell devices may be employed in the sending station. It will also be evident that the type of signal to be given by the receiving or alarm unit may be varied without departing from the teachings of the invention.

The systems previously described will all cause effects in all of the building wiring systems associated with a single power transformer. Where it is desired to avoid such effects in neighboring buildings, a system such as that shown in Figure 4 may be employed. In this form of the invention, the sending unit may be the fire detecting unit 19b previously described in connection with Figure 3. As previously described, closing of the thermally operated switch 55 causes an asymmetric current to flow in the lines 13 and 14 across which the unit is connected. In the modification of the invention shown in Figure 4, instead of depending upon the series resistance of the lines to create the voltage for operating the receiving or alarm station, a small resistance 65 is connected into the center leg 14 of the wiring adjacent the service entry box 16, but on the building side of the box and on the building side of the ground connection 66. In the ordinary three-wire system, the normal load currents flowing in the center leg are relatively small. Hence, the losses caused by the resistance 65, which preferably is only about 0.2 ohms and of 100 watt capacity, are practically negligible. However, the resistance is such that when the circuit through the sending station 19b is closed, the direct current component of the voltage created by the IR drop across resistor 65 is sufficient to operate the receiving or alarm station 21c.

The receiving unit 21c is similar to the unit 21b except for the modifications necessary to connect the circuit including the relay 30a, condenser 31 and choke 32a across the resistor 65 and to connect the circuits controlled by the relay 30 across the legs 14 and 15 of the wiring system in order to provide the normal 110 volt A. C. supply for the horn 62. In this system, good results are obtained with a relay 30a having a sensitivity of 2.5 milliwatts and a resistance of 0.5 ohm, and a choke 32a having a resistance of 0.5 ohm and an inductance of 0.5 henry; otherwise the values of the components may be the same as given above. This unit embodies the thermally operated switch 58 as before, and the alarm horn circuit is controlled by the alternating current relay 61 which, as before, is locked in, once the relay 61 is closed. Switch 48 opens the circuit and renders the device inoperative, and pilot light 49 burns whenever the device is connected in the circuit and the switch is closed. This type of alarm may be disposed adjacent the service entrance box and may be operated by one or more sending or detecting stations 19b. Devices of this type operated by the voltage drop in a small resistor in the central leg of the wiring system also may be used for signaling or control purposes. This type of system is advantageous in that it does not respond to voltages developed in the circuit outside of the service entrance box, and is useful largely in connection with devices such as alarms, furnace controls or the like which can be disposed in the basement of the building adjacent the service entry box. With a system of this type, if the receiving unit is to be located at a point remote from the service entry box, additional wiring will be required.

From the foregoing description of preferred forms of my invention, it will be seen that I have provided a simple and effective remote control system which can be connected into ordinary wiring systems merely by plugging the sending and receiving units into the wiring system. Those skilled in the art will appreciate that various changes and modifications may be made in the forms of the system described herein without departing from the spirit and scope of my invention. For example, different means may be utilized for controlling the sending stations, and the receiving stations may be adapted to control instrumentalities different from those disclosed herein. The systems disclosed herein all involve the production of voltages having direct current components between the lines of the wiring system. As noted above, alternating currents of different frequencies than the power supply may be employed. Various other changes and modifications in the invention may be made in order to adapt it to different uses and purposes. Therefore, it is to be understood that my patent is not limited to the preferred forms described herein by way of example, or in any manner other than by the scope of the appended claims.

I claim:

1. A remote control system adapted to utilize a conventional alternating current wiring system to transmit an electric impulse from a sending station to a receiving station, a sending station comprising a normally open switch, an asymmetric conducting device, a resistor and a normally closed thermostatic switch all connected in series and adapted to be connected across two lines of the wiring system, said thermostatic switch having a heating coil connected in parallel with said asymmetric conducting device, said thermostatic switch being arranged to open after current has flowed through the heating coil thereof for a predetermined period of time, thereby cutting off the flow of current through said asymmetric conducting device.

2. In a remote control system adapted to utilize a conventional alternating current wiring system to transmit an electric impulse from a sending station to a receiving station, a sending station comprising a normally open switch, an asymmetric conducting device, a resistor and a normally closed thermostatic switch all connected in series and adapted to be connected across two lines of the wiring system, said thermostatic switch having a heating coil connected in parallel with said asymmetric conducting device, said thermostatic switch being arranged to open after current has flowed through the heating coil thereof for a predetermined period of time, thereby cutting off the flow of current through said asymmetric conducting device, said sending station also including a glow-type pilot light connected in parallel with said normally open switch, said asymmetric conducting device and said resistor and in series with said thermostatic switch, whereby said pilot light will burn when said sending station is connected across said line so long as said thermostatic switch remains closed, and will be extinguished when said thermostatic switch is opened.

3. A remote control system adapted to utilize a conventional three-wire alternating current wiring system embodying a source of E. M. F. and a load to transmit an electric impulse from a sending station to a receiving station, said remote control system comprising a sending station embodying an asymmetric conducting device and switch means for connecting said asymmetric conducting device across two lines of the wiring system and in parallel with the load thereby to cause an asymmetric current to flow in said wiring system and in parallel with the load, a resistor in the center leg of the wiring system connected in series with the center leg at a point between the sending station and the ground, and a receiving station connected to the wiring system across the resistor, said receiving station comprising a direct current controlled device, said direct current controlled device being operable by the direct current component of the voltage developed by reason of the IR drop across said resistor resulting from the flow of said asymmetric current.

CARL L. GOODWIN.

REFERENCES CITED

The following references are of record in the file of this patent:

UNITED STATES PATENTS

| Number | Name | Date |
|---|---|---|
| 1,781,497 | Crago | Nov. 11, 1930 |
| 2,213,100 | Cianchi | Aug. 27, 1940 |
| 2,263,298 | Haimbaugh | Nov. 18, 1941 |
| 2,287,164 | Bowsher | June 23, 1942 |
| 2,297,816 | Torkelson | Oct. 6, 1942 |
| 2,305,862 | Gilliver et al. | Dec. 22, 1942 |
| 2,347,108 | Hubbard | Apr. 18, 1944 |
| 2,347,777 | Hanscom | May 2, 1944 |
| 2,375,722 | Woodworth | May 8, 1945 |
| 2,387,444 | Hayslett | Oct. 23, 1945 |
| 2,397,028 | McBrien | Mar. 19, 1946 |